March 9, 1965 R. E. POOLE 3,173,089
SYSTEM FOR PULSE AMPLITUDE MEASUREMENT
Filed May 26, 1960 4 Sheets-Sheet 1
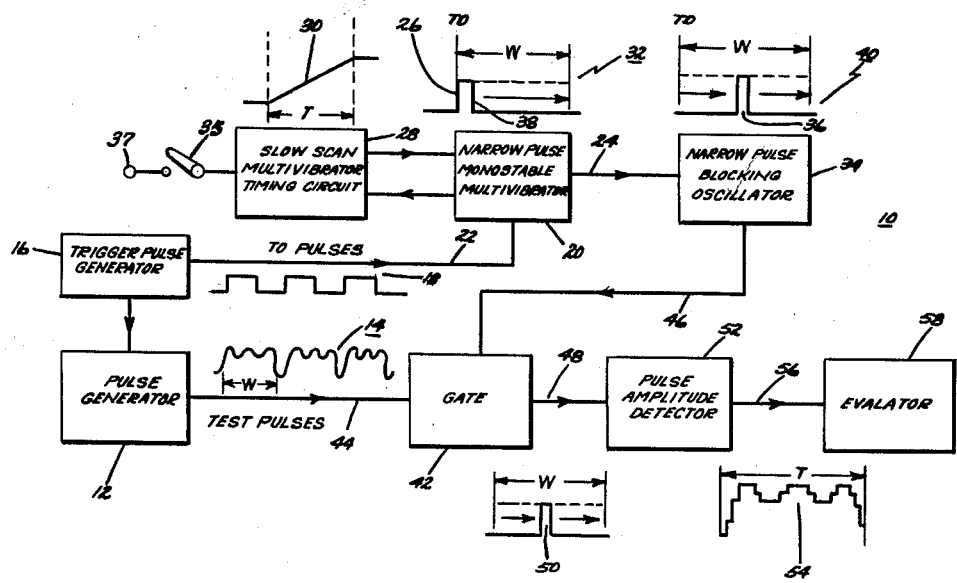
Fig. 1.
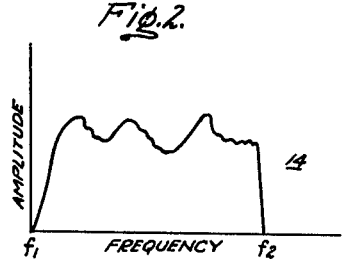
Fig. 2.
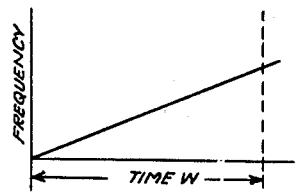
INVENTOR.
Ronald E. Poole,
BY *Just & Drish*
Attorneys.

INVENTOR.
Ronald E. Poole,
BY Just & Orish
Attorneys.

March 9, 1965   R. E. POOLE   3,173,089
SYSTEM FOR PULSE AMPLITUDE MEASUREMENT
Filed May 26, 1960   4 Sheets-Sheet 4
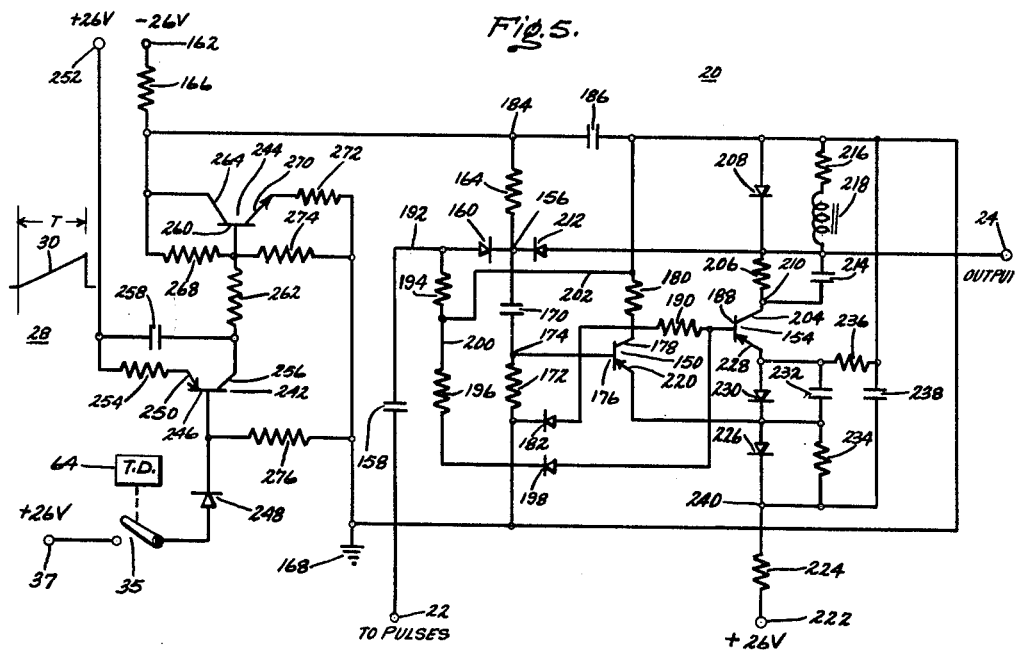
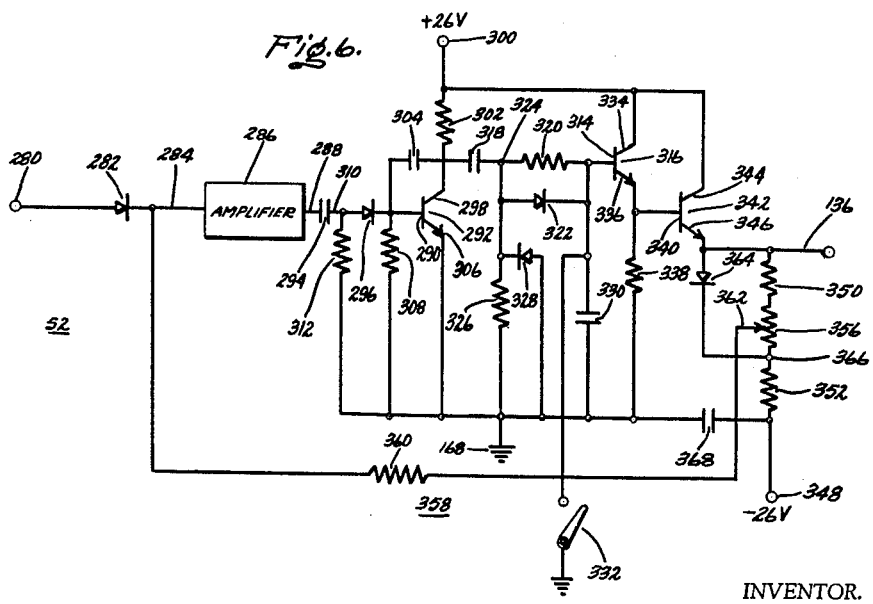
INVENTOR.
Ronald E. Poole,
BY Just & Drish
Attorneys.

United States Patent Office 3,173,089
Patented Mar. 9, 1965

3,173,089
SYSTEM FOR PULSE AMPLITUDE
MEASUREMENT
Ronald E. Poole, Caldwell Township, N.J., assignor to
International Telephone & Telegraph Corporation
Filed May 26, 1960, Ser. No. 32,009
13 Claims. (Cl. 324—102)

This invention relates to a system for measuring the amplitude of a pulse at any selected point or all points along the pulse waveform.

While voltage pulses provided in electronic apparatus are normally intended to be square, i.e., with minimum rise and fall time and an essentially constant level between the leading and trailing edges, most pulses are not in fact square, particularly radio frequency sweep pulses in which the frequency of a pulsed signal is swept in linear or sawtooth fashion from a lower to a higher value during the pulse. It is therefore desirable to provide a system for accurately measuring the amplitude of a pulse at any desired point along its waveform, or at all points along any desired portion of the waveform or along the entire waveform. To the best of the present applicant's knowledge, no system has been proposed for performing a point by point measurement of the voltage of a pulse waveform, it having been necessary in the past in order to effect such a measurement to display the pulse on an oscilloscope and to effect the measurement empirically.

In accordance with the broader aspects of my invention, therefore, I provide a system for measuring the amplitude of the pulses of a train of pulses at a plurality of points along the waveform of the pulses comprising a source of periodically recurring first pulses the amplitude of which is to be measured and a source of periodically recurring second pulses having the same repetition frequency as the first pulses with their leading edges respectively coincident with the leading edges of the first pulses. Means are provided for generating third pulses of variable width responsive to the second pulses, and means are also provided for linearly increasing the width of the third pulses over a predetermined period during which a plurality of the first and second pulses occur. Means are provided for generating fourth pulses respectively responsive to the trailing edges of the third pulses, the fourth pulses being substantially narrower than the first pulses. Gate means are provided coupled to the source of the first pulses and to the generating means of the fourth pulses for passing segments of the first pulses during the occurrence of the fourth pulses thereby to provide fifth pulses respectively coincident with the fourth pulses and respectively having amplitudes proportional to the amplitudes of the first pulses at the points of coincidence with the fourth pulses. Means are provided for measuring the amplitudes of the fifth pulses and in the preferred embodiment of the invention, the pulse amplitude measuring means comprises a pulse amplitude detector for detecting the peak amplitude of each such fifth pulse to provide a direct current signal having a level responsive to the peak amplitude, and memory means for maintaining the level between the occurrence of the fifth pulses, thereby to provide a direct current output signal having a level during the predetermined period of linear increase of the width of the third pulses which follows the amplitude of the first pulses along their waveform.

It is accordingly an object of my invention to provide a system for measuring the amplitude of a pulse at all points along the pulse waveform.

Another object of my invention is to provide a system for measuring the amplitude of the pulses of a train of pulses at a plurality of points along the waveform of the pulses.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a block diagram showing the fundamental elements of the system of my invention;

FIG. 2 shows an RF sweep pulse in which the frequency of the pulse is varied linearly in sawtooth fashion during the duration W of the pulse;

FIG. 5 is a schematic illustration of the narrow pulse monostable multivibrator and slow scan multivibrator timing circuit of the embodiment of FIG. 3; and FIG. 6 is a schematic illustration showing the pulse amplitude detector of the embodiment of FIG. 3.

Figure 3:
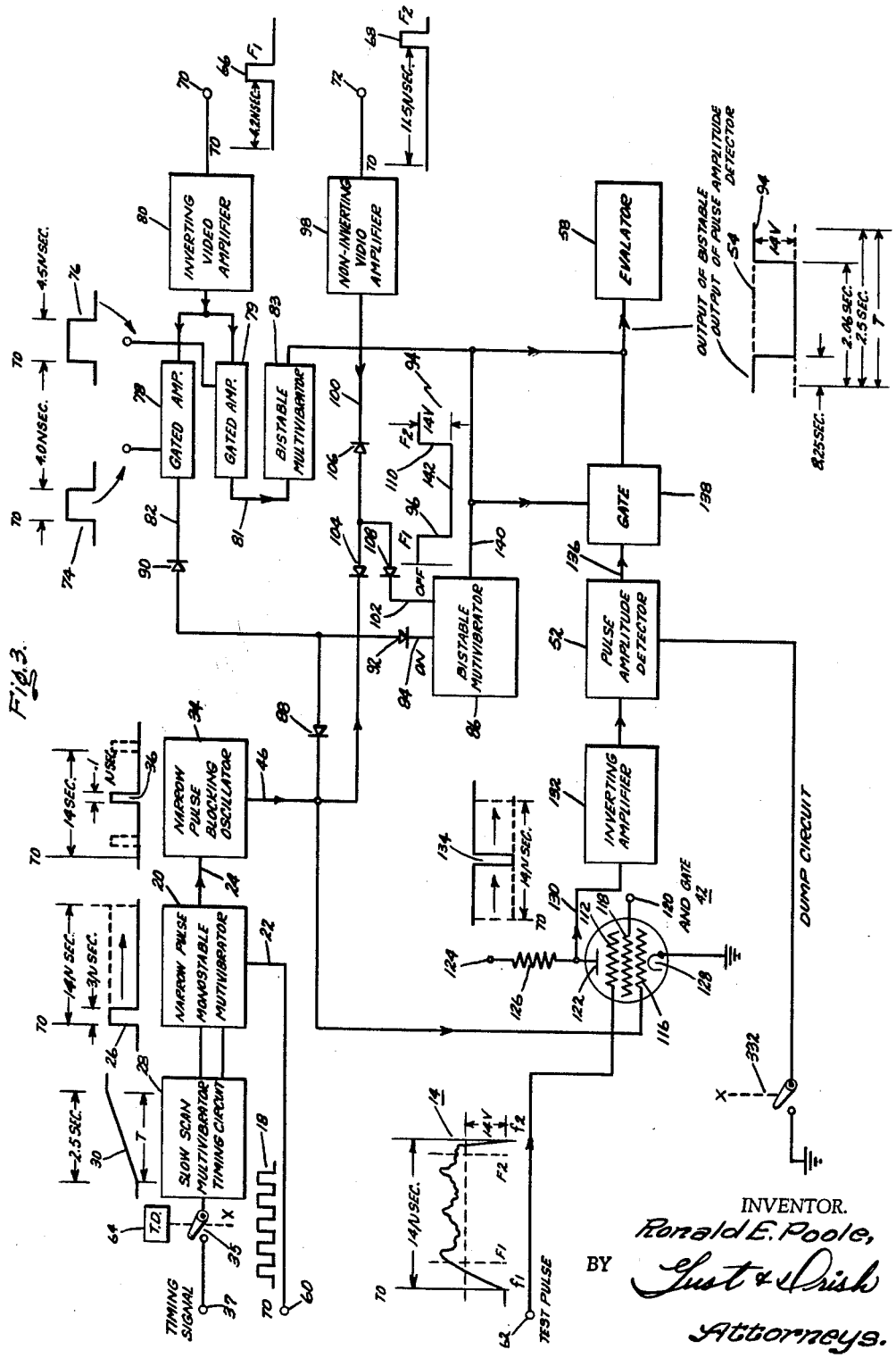
FIG. 3 is a block diagram showing the preferred embodiment of my invention for measuring the amplitude of a radio frequency sweep pulse between predetermined points on its waveform.

Referring now to FIG. 1, in its simplest form, my improved pulse amplitude measuring system, generally identified at 10, comprises a pulse generator 12 which provides a train of pulses 14 the amplitude of which is to be measured. Pulses 14 may be video pulses, each having a duration "W," or may be radio frequency sweep pulses as shown in FIG. 2 in which the frequency of the signal is varied linearly in sawtooth fashion from $f_1$ to frequency $f_2$ during the period W; if the pulse generator 12 provides a radio frequency sweep, it will be understood that an RF detector will be required following pulse generator 12 in order to generate a voltage waveform acceptable to the gate 42 to be hereinafter described. In the system shown in FIG. 1, pulse generator 12 is triggered to provide pulses 14 by trigger pulse generator 16 which provides a train of trigger pulses 18 having the same pulse repetition frequency as the test pulses 14 and having their leading edges respectively coincident with the initiation of the test pulses 14.

In order to measure the ampliutde of pulses 14 at all points along their respective waveforms, I provide a monostable multivibrator 20 coupled to trigger pulse generator 16 by connection 22 and triggered thereby to provide in its output circuit 24 narrow pulses 26 of variable width. Monostable multivibrator 20 includes a time constant circuit for determining the width of pulses 26 to which is connected a slow scan timing circuit 28. Slow scan timing circuit 28 may be a variable reactance device which is varied in sawtooth fashion, as indicated at 30 over period T; period T is preferably substantially longer than the duration of test pulses 14 and trigger pulses 18 so that a substantial number of test and trigger pulses occur during period T. Timing circuit 28, together with the time constant circuit of multivibrator 20 are arranged so that the width of pulses 26 provided by multivibrator 20 vary from a small fraction of the width W of test pulses 14 to substantially the same width as test pulses 14. Thus each successive pulse 26 provided by multivibrator 20 in response to each successive trigger pulse 18 is wider than its predecessor so that over the period T, pulses 26 progressively increase in width from a narrow pulse to a pulse substantially the same width as that of test pulses 14. The action of slow scan multivibrator timing circuit 28 is initiated by swich 35 which couples timing circuit 28 to a suitable source 37 of energizing potential; switch 35 may be closed and then again opened after period T by a suitable time delay mechanism as is well known to those skilled in the art. In the illustrated embodiment, the leading edges of the trigger pulses 18 are referred to as $T_0$.

A narrow pulse blocking oscillator 34 is provided coupled to output circuit 24 of monostable multivibrator 20 and providing one narrow pulse 36 in response to the trailing edge 38 of each pulse 26 provided by monostable multivibrator 20. Thus, as shown at 40 in FIG. 1, each successive pulse 36 provided by blocking oscillator 34 occurs a longer time after $T_0$ than its immediate predecessor. Thus, over the period T, the narrow pulses 36 provided by blocking oscillator 34 are in essence scanned between $T_0$ and the trailing edge of pulses 14. Pulses 36 are provided by a narrow pulse blocking oscillator 34 and are substantially narrower than test pulses 14, and it will be seen that there is provided one pulse 36 for each trigger pulse 18 and test pulse 14, each successive pulse 36 being delayed from the leading edge $T_0$ of its respective trigger pulse 18 by a longer period equal to the width of pulses 26.

Pulse generator 12 is coupled to gate circuit 42 by connection 44, gate 42 being coupled to blocking oscillator 34 by connection 46 and opened responsive to each narrow pulse 36. Thus, each test pulse 14 is impressed upon gate 42, however, gate 42 is opened to pass only a segment of each test pulse 14 during the occurrence of the respective narrow pulse 36. Gate 42 thus passes to its output circuit 48 a pulse 50 coincident with the respective pulse 36 but having an amplitude proportional to the amplitude of the respective test pulse 14 at the instant the respective pulse 36 occurs. It will be observed that there is one pulse 50 for each test pulse 14 with each successive pulse 50 having a longer time delay with respect to time $T_0$, i.e., the leading edge of the respective trigger pulse 18, these time delays varying progressively from the minimum width of pulses 38 provided by monostable multivibrator 20 through time W, i.e., the duration of test pulses 14.

Pulses 50 are impressed upon pulse amplitude detector 52 which includes detector means for detecting the peak amplitude of each pulse and providing a direct current signal having a level responsive thereto, and memory means for storing the signal level between successive detected pulses, thereby to provide an output signal 54 having a direct current level responsive to the amplitudes of the successive pulses 50. It will now be seen that the output signal 54 provided by pulse amplitude detector 52 will have a duration T, i.e., the duration of the scan 30 of monostable multivibrator 20 provided by multivibrator timing circuit 28, the output signal 54 reproducing in stairstep fashion the individual test pulses 14. Thus, while the individual test pulses 14 may have an extremely short duration, such as fourteen microseconds, the time T and thus the duration of output signal 54 may be several seconds. The output circuit 56 of pulse amplitude detector is coupled to a suitable evaluator 58 which may for example be a voltage comparator which will compare the level of the output signal 54 from pulse amplitude detector 52 with predetermined upper and lower limit voltages and provide an indication when the level of the output signal 54 is above or below a predetermined tolerance. Further, since the time T is well within the response capabilities of recording-type instruments, evaluator 58 may be a recording voltmeter, thus providing an accurate plot of the waveform of the test pulses 14.

As indicated in FIG. 2, the test pulses 14 may be radio-frequency sweep pulses in which the frequency of the pulse is swept between frequency $f_1$ and frequency $f_2$ in linear or sawtooth fashion over time W. Since the amplitude of the output signal provided by all radio frequency oscillators known to the present applicant, including particularly travelling wave tubes, varies with frequency, the amplitude waveform of a given radio frequency pulse which is swept between $f_1$ and $f_2$ during its duration W may have the characteristics shown in FIG. 2.

Figure 4:
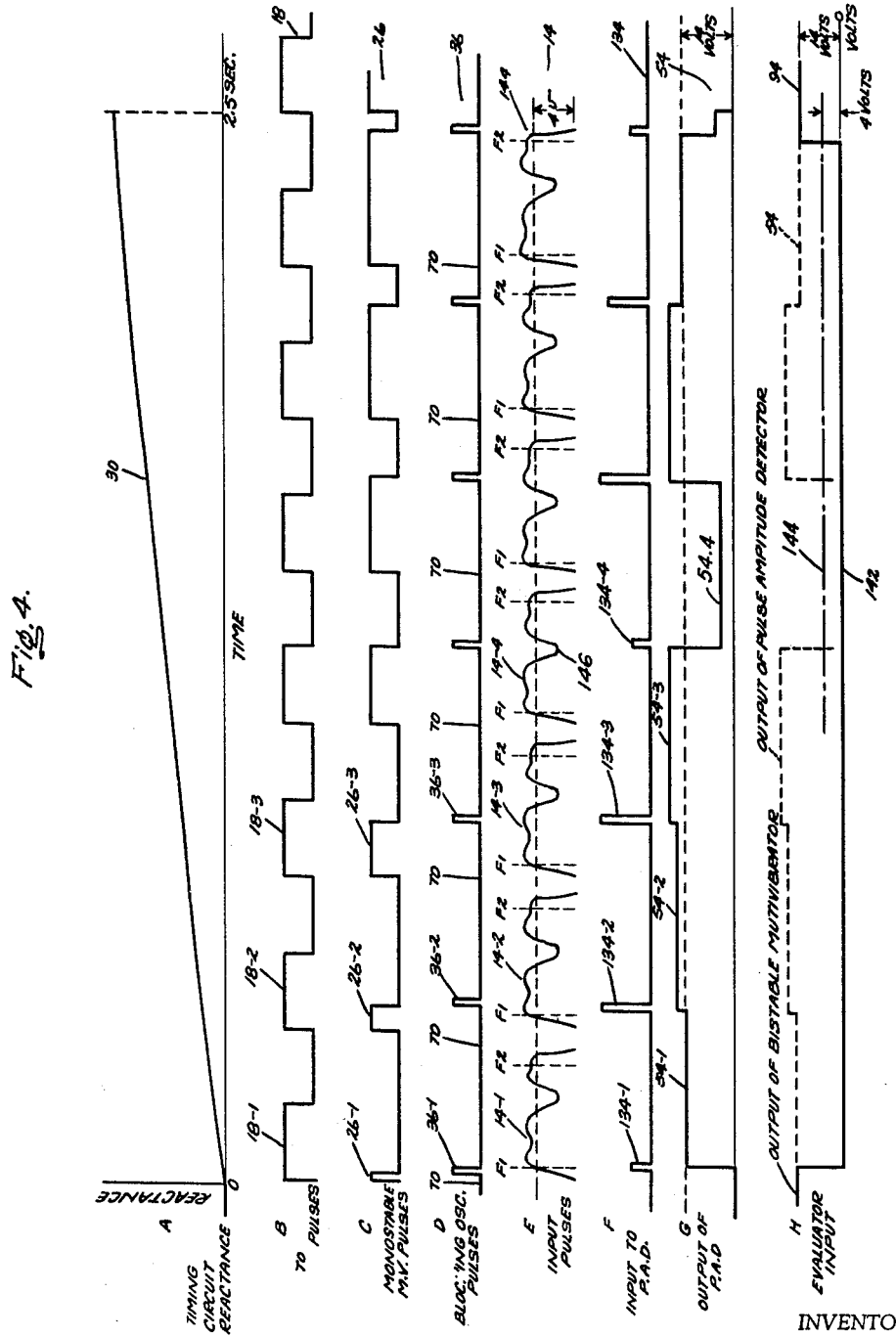
FIG. 4 illustrates waveforms found in the system of FIG. 3.

Turning now to FIGS. 3 and 4 in which like elements are indicated by like reference numerals, there is shown the preferred embodiment of my invention, which provides an indication as to whether the amplitude level of a radio frequency sweep pulse is above or below a predetermined level between predetermined points. Here, the $T_0$ or trigger pulses 18 are applied to input terminal 60 and the test pulses are applied to input terminal 62. As indicated in FIG. 1, trigger or $T_0$ pulses 18 have their leading edges respectively coincident with the initiation of each test pulse 14; pulses 18 may be the pulses which were employed to trigger or initiate test pulses 14, or may in the alternative be square pulses initiated by the test pulses.

$T_0$ pulses 18 are applied to the trigger signal input circuit 22 of monostable multivibrator 20, which has its time constant which determines the width of its output pulses 26 varied in sawtooth fashion by slow scan multivibrator timing circuit 28. The preferred circuitry for narrow pulse monostable multivibrator 20 and slow scan multivibrator timing circuit 28 is shown in FIG. 5 and is described hereinafter. Operation of slow scan multivibrator circuit 28 to provide reactance characteristic 30 varying in sawtooth fashion over period T, which may be 2.5 seconds, is initiated by a suitable timing signal applied to slow scan multivibrator timing circuit 28 from timing signal source 37 by switch 35; switch 35 may have a suitable time delay device 64 connected thereto for opening the same thereby to terminate operation of the slow scan multivibrator timing circuit 28 after time T. The pulses 26 provided by narrow pulse monostable mulitvibrator 20 may have a minimum width of three microseconds, the width of each successive pulse 26 triggered by a respective trigger pulse 18 being progressively increased over period T to a maximum of fourteen microseconds corresponding to the duration of the test pulses 14. Output circuit 24 of narrow pulse monostable multivibrator 20 is coupled to narrow pulse blocking oscillator 34, which may be of any conventional type; the trailing edge of each pulse 26 provided by multivibrator 20 triggers blocking oscillator 34 to provide narrow pulse 36, which may have a duration of .1 microsecond. Thus, it will be seen that the first narrow pulse 36 provided by narrow pulse blocking oscillator 34 occurs three microseconds after the leading edge of the respective trigger pulse 18, i.e., time $T_0$, and that each successive pulse 36 corresponding to a respective trigger pulse 18 and pulse 26 from multivibrator 20 occurs a longer time interval following $T_0$, the interval extending to a total of fourteen microseconds over the period T. Thus, the narrow pulses 36 provided by blocking oscillator 34 are in essence swept over time T from $T_0$ plus three microseconds to $T_0$ plus fourteen microseconds.

In the illustrated embodiment, it is desired to evaluate the amplitude level of the test pulses 14 between frequencies $F_1$ and $F_2$, frequency $F_1$ in the illustrated embodiment being at a point 4.2 microseconds following $T_0$ of each pulse, and frequency $F_2$ being at a point 11.5 microseconds following $T_0$ of each pulse. It is further desirable to ascertain whether the amplitude level of test pulses 14 falls below fourteen volts between frequencies $F_1$ and $F_2$.

A pulse 66 is provided for each test pulse 14 and trigger pulse 18 4.2 microseconds following $T_0$ and a second pulse 68 is provided for each test and trigger pulse 14, 18 11.5 microseconds following $T_0$. These pulses respectively indicate frequencies $F_1$ and $F_2$, being respectively applied to input terminals 70 and 72. In the specific embodiment of the invention for measuring radio frequency sweep pulses, which may be swept, for example, between 1,000 megacycles and 1,500 megacycles, trigger pulse generator 16 also triggers two other narrow pulse multivibrators (not shown) which provide pulses 74 and 76 at 4.0 microseconds and 4.5 microseconds respectively following $T_0$ of each pulse 14. In order to insure that the $F_1$ pulse 66 in fact occurs at the desired interval of 4.2 microseconds following $T_0$, of each test and trigger pulse 14, 18 or very closely thereto, the pulses 74 and 76 are applied to gated amplifiers 78 and 79 respectively, pulse 74 holding gated amplifier 78 "off" from $T_0$ to $T_0$ plus 4.0 microseconds; this arrangement keeps erroneous and spurious pulses at or near $T_0$ from triggering the circuit. Pulse 76 holds gated amplifier 79 "off" until $T_0$ plus 4.5 microseconds. The output circuit 81 of gated amplifier 79 is directly connected to bistable multivibrator 83. Thus, if $F_1$ arrives later than $T_0$ plus 4.5 microseconds, i.e., an incorrect signal, bistable multivibrator 83 turns on and overrides any output of the pulse amplitude detector 52 to evaluator 58. Thus, it will be observed that gated amplifier 78 is turned on thereby to pass a signal during the .5 microsecond interval between 4.0 microseconds and 4.5 microseconds following $T_0$. Input terminal 70 which receives the $F_1$ pulse 66 is coupled to inverting amplifier 80 which in turn is coupled to gated amplifier 78, and thus it will be seen that if in fact the $F_1$ pulse 66 occurs between 4.0 microseconds and 4.5 microseconds following $T_0$ of each test and trigger pulse 14, 18, pulse 66 will be passed by gated amplifier 78 to its output circuit 82; it will be understood that gated amplifier 78 inverts the pulse applied thereto, and thus in order to provide a positive-going pulse in its output circuit 82, inverting amplifier 80 is inserted in the input circuit 84 of gated amplifier 78.

Output circuit 82 of gated amplifier 78 and output circuit 46 of blocking oscillator 34 are coupled to the "turn on" input circuit 84 of bistable multivibrator 86 by an "AND" circuit formed of diodes 88, 90 and 92 as is well known to those skilled in the art. Thus it will be comprehended that when an $F_1$ pulse 66 in the output circuit 82 of gated amplifier 78 coincides in time with a pulse 36 provided by blocking oscillator 34, a pulse will be impressed upon the "turn on" input circuit 84 of bistable multivibrator 86 to turn the same on. It will be observed that the first pulse 36 provided by blocking oscillator 34 following closing of switch 35 occurs three microseconds following $T_0$ of the first pulse 14 being measured, i.e., the minimum duration of pulses 26 provided by monostable multivibrator 20, the first pulse 36 (and every pulse 36) having a duration of .1 microsecond. Thus, since the $F_1$ pulse 66 of the first test pulse 14 occurs 4.2 microseconds following $T_0$, by the time it is impressed upon the adding circuit 88, 90 and 92, the first narrow pulse 36 of blocking oscillator 34 has disappeared. After a number of test and trigger pulses 14 and 18, however, the pulses 26 provided by monostable multivibrator 20 will have a sufficiently long duration so that a pulse 36 occurs at 4.2 microseconds following $T_0$; this pulse 36 thus coincides with a pulse 66 in the AND circuit thus impressing a pulse on bistable multivibrator 86 to turn the same on. Bistable multivibrator 86 is arranged to provide a positive 14 volt level when it is turned off, and when turned on its output level drops to zero, as shown at 94. Thus, bistable multivibrator 86 is turned on at 96 at an instant bearing the same relationship to the start of period T as $F_1$ pulse 66 bears to $T_0$; thus the turn on 96 of bistable multivibrator 86 will occur at approximately .825 second following initiation of period T.

Since in the embodiment being described, the $F_2$ pulse 68 bears a fixed time delay relationship to the $F_1$ pulse 66, if the $F_1$ pulse 66 occurs within the .5 microsecond interval between pulses 74 and 76, it is assured that the $F_2$ pulse 68 also occurs within the desired time limits following time $T_0$. Thus, input terminal 72 is connected to non-inverting video amplifier 98 which has its output circuit 100 and output circuit 46 of narrow pulse blocking oscillator 34 coupled to the "turn off" input circuit 102 of bistable multivibrator 86 by an AND circuit formed of diodes 104, 106 and 108. Thus, when a narrow pulse 36 provided by a blocking oscillator 34 for a given test pulse 14 and trigger pulse 18 occurs at 11.5 microseconds following $T_0$ of the respective test and trigger pulses and thus coincides with an $F_2$ pulse 68 of the same pulses, a turn off pulse will be impressed upon bistable multivibrator 86 thereby increasing its output signal level back to fourteen volts as shown at 110. As in the case of the turn on 96 of bistable multivibrator 86, the time of turn off 110 bears the same relationship to the start of period T as $F_2$ pulse 86 bears to time $T_0$; and thus, bistable multivibrator 86 will be turned off at approximately 2.06 seconds following the start of period T.

Input terminal 62, which receives test pulses 14 is coupled to suppressor grid 112 of AND gate tube 42, such as 6AS6, and output circuit 46 of narrow pulse blocking oscillator 34 is coupled to the control grid 116. Screen grid 118 is coupled to a suitable source of direct current potential 120, such as $+150$ volts. Plate 122 of AND gate tube 42 is coupled to a suitable source 124 of plate potential, such as $+150$ volts by a plate resistor 126 and cathode 128 may be connected to ground as shown. Output circuit 130 of AND gate tube 42 is coupled to inverting amplifier 132 which inverts the negative going pulses 134 provided by the AND gate 42.

It will now be seen that output pulse 134 from AND gate 42 is provided only during the occurrence of a pulse 36 from narrow pulse blocking oscillator 34, thus, each pulse 134 provided by the AND gate 42 has an amplitude responsive to the amplitude of the test pulse 14 at the interval when the respective narrow pulse 36 occurs. It is thus seen that test pulse 14 is in essence divided into a multiplicity of .1 microsecond increments (.1 microsecond being the duration of pulses 36 from narrow pulse blocking oscillator 34) with the amplitude of each successive test pulse 14 being sampled at the next successive increment corresponding to the respective pulse 36. Thus, pulses 134 coincide in time with pulses 36 provided by blocking oscillator 34 with the amplitude of each pulse 134 being proportional to the amplitude of the respective test pulse 14 at the instant the respective pulse 36 from narrow pulse blocking oscillator 34 occurs.

Inverting amplifier 132 inverts the negative-going pulses 134 from AND gate 42 and impresses them upon pulse amplitude detector 52. The preferred embodiment of pulse amplitude detector 52 is shown in FIG. 6 and its operation will be hereinafter more fully described. Pulse amplitude detector 52 includes means for detecting each pulse 134 to provide a direct current signal having a level proportional to the amplitude of the pulse, and memory means for maintaining the level of each pulse during the interval between the pulses, thereby to provide a direct current output signal having a level corresponding to the amplitude of the test pulses 14 and the output signal, however, having a duration T. In the illustrated embodiment, output circuit 136 of pulse amplitude detector 52 is coupled to evaluator 58 by gate circuit 138 which is coupled to output circuit 140 of bistable multivibrator 86 and triggered thereby so that gate 138 is open during the period bistable multivibrator 86 is turned on. The output circuit 140 of bistable multivibrator 86 is also directly connected to evaluator 58 as shown. In the illustrated embodiment, evaluator 58 is of the type which provides an indication when the input signal deviates from a predetermined level by a predetermined amount. Thus, in the intervals between the times when bistable multivibrator 86 is turned on, the fourteen volt level provided by bistable multivibrator 86 is applied to evaluator 58 and the output of pulse amplitude detector 136 is prevented from being applied to evaluator 58 by the fact that gate 138 is closed. However, when bistable multivibrator 86 is turned on, thus terminting application of its fourteen volt level to evaluator 58, gate 138 is opened, thus applying the output signal of pulse amplitude detector 52 to the evaluator 58. If, during the interval between the turn on 96 and turn off 110 of bistable multivibrator, the output signal of pulse amplitude detector 52 has a predetermined level, such as four volts or higher, i.e., at no point does it drop below four volts, as shown by dashed line 144, evaluator 58 will provide a "GO" indication. However, if at any time between points $F_1$ and $F_2$ of any pulse 14, the amplitude falls below four volts, the output signal of pulse amplitude 52 will likewise fall below four volts and thus evaluator 58 will give a "NO GO" indication.

Turning now briefly to FIG. 4, the mode of operation of the system of FIG. 3 will be further explained by the use of the waveforms shown. Diagram A of FIG. 4 shows the reactance characteristic provided by slow scan multivibrator timing circuit 28 over the period T shown to be 2.5 seconds. It will be readily understood, increased reactance applied in the time constant circuit of monostable multivibrator 20 provide an output pulse 26 having an increased duration, and thus, as the reactance characteristic 30 is progresively increased in sawtooth fashion, as shown, over the period T of 2.5 seconds, the duration of each successive pulse 26 provided by the monostable multivibrator 20 will be increased.

In FIG. 4B, there is shown a train of $T_0$ pulses 18, it being understood that whereas only seven such pulses are shown as occurring during the period T of 2.5 seconds, in actual practice, trigger pulses 18 and test pulses 14 will have a pulse repetition frequency on the order of 500 pulses per second, and thus that there would actually be 1250 pulses 18 and test pulses 14 occurring during period T of 2.5 seconds. In FIG. 4C, there is shown the progressively longer pulses 26 provided by monostable multivibrator 20, it being observed that the first pulse 26-1 has a minimum width of three microseconds and that each successive pulse 26-2, 26-3, etc. is progressively longer by virtue of the linear increase of reactance provided by multivibrator timing circuit 28. It will be recalled that the blocking oscillator pulses 36 were triggered by the trailing edge of the pulses 26 of monostable multivibrator 20. It will thus be observed that each successive oscillator pulse 36-1, 36-2, 36-3, etc. occurs after a longer time delay following $T_0$ of the respective trigger pulse 18-1, 18-2, 18-3, etc., the time delay of the respective narrow pulse 36 being the same as the duration of the respective pulse 26, as shown.

FIG. 4E shows the train of test pulses 14, each of which is initiated coincident with the leading edge $T_0$ of a respective trigger pulse 18. FIG. 4F shows the resulting pulses 134 provided by the AND gate 42 after inversion in inverting amplifier 132, i.e., the pulses which are impressed upon pulse amplitude detector 52. It will be observed that the pulses 134-1, 134-2, 134-3, etc., are respectively in time coincidence with pulses 36-1, 36-2, 36-3, etc. with their amplitudes respectively being proportional to the amplitude of the respective test pulse 14-1, 14-2, 14-3, etc. at the respective intervals.

FIG. 4G shows the output of the pulse amplitude detector 52, it being observed that the output signal 54 is made up of successive levels 54-1, 54-2, 54-3, etc., corresponding respectively to the levels of the pulses 134-1, 134-2, 134-3, etc., provided by the AND gate 42.

In FIG. 4H there is shown the signal applied to evaluator 58 it being clearly seen that the output signal 94 of the bistable multivibrator 86 is reduced to zero level between turn on 96 and turn off 110, the resultant negative-going pulse 142 opening gate 138 thereby to impress output signal 54 of pulse amplitude detector 52 on the evaluator 58. Inspection of FIG. 4E will reveal that at one point along their waveform, the test pulses 14 fall below the desired four volt level 144. Pulse 134-4 from the AND gate 42 occurs during test pulse 14-4 and coincides with the portion 146 of the waveform of test pulses 14 which is below the four volt level 144. Thus, pulse 134-4 results in level 54-4 which is below the desired four volt level and thus will be sensed by evaluator 58.

Turning now to FIG. 5, there is shown the specific circuitry of the preferred embodiment of the narrow pulse monostable multivibrator timing circuit 28; this circuitry is not claimed as a part of my present invention, being covered by my co-pending application Serial Number 38,641, filed June 24, 1960. Monostable multivibrator 20 comprises two transistors 150 and 154. The trigger or $T_0$ pulses 18 are applied at input circuit 22 which is coupled to point 156 by a capacitor 158 and diode 160. Point 156 is coupled to a −26 volt source of negative potential 162 by resistors 164 and 166. Point 156 is connected to ground 168 by capacitor 170 and resistor 172 with point 174 therebetween being directly connected to the base 176 of transistor 150. The collector 178 of transistor 150 is connected to ground 168 by resistor 180 and also by diode 182. Point 184 between resistors 164 and 166 is connected to ground 168 by capacitor 186. Collector 178 of transistor 150 is connected to base 188 of transistor 154 by resistor 190 and base 188 is connected to point 192 between capacitor 158 and diode 160 by resistors 194 and 196 and diode 198. Point 200 between resistors 194 and 196 is connected to ground by connection 202, as shown.

Collector 204 of transistor 154 is connected to ground by resistor 206 and diode 208. Point 210 between resistor 206 and diode 208 is connected to point 156 by diode 212 and also to output circuit 24. Capacitor 214 is connected in shunt across resistor 206 and point 210 is also connected to ground 168 by a resistor 216 and inductance 218 connected in series.

Emitter 220 of transistor 150 is connected to source 222 of positive 26 volt potential by resistor 224 and diode 226. Emitter 228 of transistor 154 is connected to emitter 220 of transistor 150 by diode 230, capacitor 232 being connected in shunt across diode 230 and resistor 234 being connected in shunt across diode 226. Emitter 228 of transistor 154 is connected to ground by resistor 236 with capacitor 238 connecting point 240 between diode 226 and resistor 224 to ground as shown.

Timing circuit 28 comprises transistors 242 and 244 with transistor 242 having its base 246 connected to the timing signal source 36, which may be positive 26 volts, by switch 35 and diode 248. Emitter 250 of transistor 242 is connected to source 252 of suitable positive potential such as +26 volts by resistor 254 and collector 256 of transistor 242 is connected to source 252 by capacitor 258. Collector 256 of transistor 242 is also connected to base 260 of transistor 244 by resistor 262. Collector 264 of transistor 244 is connected to source 162 of −26 volt potential by resistor 166 and resistor 268 connects collector 264 to base 260, as shown. Emitter 270 of transistor 244 is connected to ground 168 by resistor 272 with base 260 being connected to ground by resistor 274. Base 246 of transistor 242 is also connected to ground by resistor 276.

The operation of the monostable multivibrator 20 is conventional and need not be more fully described other than to state that capacitor 170, together with the impedance of transistor 244 and its associated resistors 268, 272 and 274, constitute the time constant circuit for multivibrator 20, thereby to determine the width or duration of output pulses 26. It will be observed that resistors 268 and 274 are connected between ground and the source of negative potential 162, and thus constitute a voltage divider to provide a normal base bias on base 260 of transistor 244 so that the transistor 244 normally conducts heavily in the absence of a positive going signal applied to its base. With transistor 244 conducting heavily, i.e., with a heavy current flow flowing between its collector 264 and emitter 270, resistors 268 and 274 are in essence short circuited so that the resistance provided in the time constant circuit of monostable multivibrator 20 is in essence that of resistor 272. In the present system, the width or duration of pulses 26 provided by monostable multivibrator 20 responds to the formula $KT = C_x R_x$. Thus, with the C of the foregoing formula being provided by capacitor 170, it will be readily apparent that as the resistance R is increased, the time delay will be increased.

In order to provide the foregoing increase in resistance in the time constant circuit of monostable multivibrator 20, switch 35 is closed, thus impressing the positive 26 volt potential upon base 246 of transistor 242. Transistor 242 is normally turned off and this sudden increase of base potential provided by closing the switch 34 turns transistor 242 on. Resistor 254 and capacitor 258 in conjunction with transistor 242 form a sawtooth generating circuit, thereby impressing a linearly increasing voltage characteristic 30 upon base 260 of transistor 244, the voltage 30 increasing in sawtooth fashion over period T. This linear increase of the voltage applied to base 260 of transistor 244 is in the direction to turn transistor 244 off, thus reducing its collector-to-emitter current flow, and thus increasing the net impedance in the time constant circuit of multivibrator 20; with transistor 244 completely turned off, the resistance $R_x$ in the time constant circuit of monostable multivibrator 20 is principally that provided by the serially connected resistors 268 and 274. It will be readily apparent that the time delay provided by the time delay device 64 should be slightly less than the time constant of the sawtooth generating circuit formed of resistor 254 and capacitor 258 and thus, if the desired period T is to be 2.5 seconds, the time constant is provided by resistor 254 and capacitor 258 should be on the order of 2.6 seconds.

The preferred embodiment of pulse amplitude detector 52 is shown in FIG. 6; pulse amplitude detector 52 does not form a part of my invention, being described and illustrated in application Serial Number 35,166, filed June 10, 1960, now Patent No. 3,002,154, of W. D. Schmitz and K. C. Schlansker. Here, input circuit 280 of pulse amplitude detector 52 which is coupled to inverting amplifier 132 includes a diode 282 connected in series with input circuit 284 of amplifier 286; amplifier 286 is a conventional non-inverting amplifier and need not be more fully described here. Output circuit 288 of amplifier 286 is coupled to base 290 of transistor 292 by serially connected capacitor 294 and diode 296. Collector 298 of transistor 292 is connected to positive source of potential 300, such as +26 volts by resistor 302. Collector 298 and base 290 of transistor 292 are coupled by capacitor 304. Emitter 306 of transistor 292 is connected to ground and base 290 is connected to ground by resistor 308. Point 310 between capacitor 294 and diode 296 is also connected to ground by resistor 312.

Collector 298 of transistor 292 is connected to base 314 of transistor 316 by serially connected capacitor 318 and resistor 320, with diode 322 being connected across resistor 320. Point 324 between capacitor 318 and resistor 320 is connected to ground by resistor 326 having diode 328 connected thereacross. Base 314 of transistor 316 is normally connected to ground by capacitor 330 and is selectively connected to ground by switch 332 which, as shown in FIG. 3, may be ganged with switch 35 so that switch 332 is closed thereby to ground base 314 of transistor 316 when switch 35 is opened.

Collector 334 of transistor 316 is connected to the source 300 of +26 volts, and emitter 336 is connected to ground by resistor 338. Emitter 336 is also connected to base 340 of transistor 342 which has its collector 344 connected to source 300 of +26 volt potential. Emitter 346 of transistor 342 is connected to source 348 of negative 26 volt potential by a voltage divider comprising resistors 350 and 352 and potentiometer 356. Emitter 346 is connected to point 366 by diode 364 and capacitor 368 connects source 348 to ground. Emitter 346 of transistor 342 is also connected to output terminal 136, and it will thus be seen that transistors 316 and 342 are emitter-follower connected.

A feedback circuit 358 is provided between potentiometer 356 and input circuit 284 of amplifier 286 by a resistor 360 coupled between the sliding element 362 of potentiometer 356 and input circuit 284; this resistor 360 forms a feedback path 358 which provides the pulse amplitude detecting operation of the pulse amplitude detector 52 which is more fully described in the aforesaid Schmitz and Schlansker application Serial Number 35,166, now Patent No. 3,002,154. Capacitor 318 and resistor 326 form an integrating circuit to stretch or store the level of each detected pulse and switch 332 by connecting diode 322 directly to ground causes a very rapid discharge of capacitor 318, thus in essence dumping the signal level normally stored in the pulse amplitude detector 52. This dumping is preferably accomplished at the end of one test period T so that the pulse amplitude detector 52 thereafter provides a zero level output signal until a new test is initiated by the closing of switch 34 and simultaneous opening of switch 332.

It will now be seen that my improved system accurately measures the amplitude of a pulse at any and all points along its waveform; it will be readily apparent that in order to inspect any segment of pulse 14 of any desired width, it is merely necessary to provide the $F_1$ and $F_2$ pulses 66 and 68 at the desired times following $T_0$. It will also be readily apparent that the pulses may be measured throughout their entire width by turning bistable multivibrator 86 on coincident with $T_0$ and likewise turning it off at the end of period T. It will be seen that my system performs a point by point amplitude measurement of a pulse waveform and it will further be readily apparent that it is equally applicable to the measurement of video pulses, radio frequency sweep pulses, or power pulses.

While I have described above the principles of my invention in connection with specific apparatus, it is to be clearly understood that this description is made only by way of example and not as a limitation to the scope of my invention.

What is claimed is:

1. A system for measuring the amplitude of the pulses of a train of pulses at a plurality of points along the waveform of the pulses comprising: a source of periodically recurring first pulses to be measured; a source of periodically recurring second pulses; means for generating third pulses of variable width responsive to said second pulses; means for linearly increasing the width of said third pulses over a predetermined period during which a plurality of said first and second pulses occur; means for generating fourth pulses respectively responsive to the trailing edges of said third pulses, said fourth pulses being substantially narrower than said first pulses; gate means coupled to said first pulses source and to said fourth pulses generating means for passing segments of said first pulses during the occurrence of said fourth pulses thereby providing fifth pulses respectively coincident with said fourth pulses and respectively having amplitudes proportional to the amplitudes of said first pulses at the points of coincidence with said fourth pulses; and mean for meauring the amplitudes of said fifth pulses.

2. A system for measuring the amplitude of the pulses of a train of pulses at a plurality of points along the waveform of the pulses comprising: a source of periodically recurring first pulses to be measured; a source of periodically recurring second pulses having the same repetition frequency as said first pulses and with their leading edges respectively in coincidence with the initiation of said first pulses; means for generating third pulses of variable width responsive to said second pulses; means for linearly increasing the width of said third pulses over a predetermined period during which a plurality of said first and second pulses occur; means for generating fourth pulses respectively responsive to the trailing edges of said third pulses, said fourth pulses being substantially narrower than said first pulses; gate means coupled to said first pulses source and to said fourth pulses generating means for passing segments of said first pulses during the occurrence of said fourth pulses thereby providing fifth pulses respectively coincident with said fourth pulses and respectively haivng amplitudes proportional to the amplitudes of said first pulses at the points of coincidence with said fourth pulses; and means for measuring the amplitudes of said fifth pulses.

3. A system for measuring the amplitude of the pulses of a train of pulses at a plurality of points along the waveform of the pulses comprising: a source of periodically recurring first pulses to be measured; means for generating second pulses of variable width having their leading edges respectively coincident with the initiation of said first pulses; means for linearly increasing the width of said pulses over a predetermined period during which a plurality of said first pulses occur; means for generating third pulses respectively responsive to the trailing edges of said second pulses, said third pulses being substantially narrower than said first pulses; means coupled to said first pulses source and to said third pulses generating means for passing segments of said first pulses during the occurrence of said third pulses thereby providing fourth pulses respectively coincident with said third pulses and respectively having amplitudes proportional to the amplitudes of said first pulses at the points of coincidence with said third pulses; and means for measuring the amplitudes of said fourth pulses.

4. The combination of claim 2 in which said third pulses generating means is a monostable multivibrator coupled to said second pulses source and triggered thereby, said multivibrator having a time constant circuit for determining the width of said third pulses; in which said third pulse width increasing means comprises variable reactance means and means for linearly varying the same in sawtooth fashion over said predetermined period; and in which said reactance means is coupled in said multivibrator time constant circuit thereby linearly to vary the width of said third pulses responsive to said linear variation of said reactance means.

5. The combination of claim 4 in which said fourth pulses generating means is a blocking oscillator coupled to said multivibrator and triggered responsive to the trailing edges of said third pulses.

6. The combination of claim 2 in which said gate means comprises a coincidence tube with said first pulses source and said fourth pulses generating means being coupled to separate grids thereof whereby said fifth pulses are provided only responsive to the coincidence of a first pulse and a fourth pulse on said grids.

7. The combination of claim 2 in which said fifth pulses amplitude measuring means comprises a pulse amplitude detector including means for detecting the peak amplitude of each said fifth pulse to provide a direct current signal having a level responsive to said peak amplitude, and memory means for maintaining said level between said fifth pulses thereby providing a direct current output signal having a level during said predetermined period which follows the amplitude of said first pulse along their waveform.

8. The combination of claim 2 further comprising means for providing first and second timing pulses during each said first pulses respectively at first and second predetermined intervals following the initiation of each said first pulse; and means coupled to said fourth pulse generating means and to said timing pulse providing means for initiating a gating pulse responsive to coincidence of a fourth pulse and a first timing pulse and for terminating said gating pulse responsive to coincidence of a fourth pulse and a second timing pulse; said gating pulse means being coupled to said measuring means for actuating the same during said gating pulse.

9. The combination of claim 8 in which said gating pulse means is a bistable multivibrator which is turned on responsive to coincidence of a fourth pulse and a first timing pulse and turned off responsive to coincidence of a fourth pulse and a second timing pulse.

10. A system for measuring the amplitude of the pulses of a train of pulses at a plurality of points along the waveform of the pulses comprising: a source of periodically recurring first pulses to be measured; a source of periodically recurring second pulses having the same repetition frequency as said first pulses and with their leading edges respectively in coincidence with the initiation of said first pulses; a monostable multivibrator coupled to said second pulses source and triggered thereby to provide third pulses, said multivibrator having a time constant circuit for determining the width of said third pulses; variable reactance means coupled in said time constant circuit; means for linearly varying said reactance means in sawtooth fashion over a predetermined period whereby the width of said third pulses is linearly increased during said period; a blocking oscillator coupled to said multivibrator and triggered responsive to the trailing edges of said third pulses thereby to provide fourth pulses respectively substantially narrower than said first pulses; a coincidence tube with said first pulses source and said blocking oscillator coupled to separate grids thereof thereby to provide fifth pulses responsive to coincidence of a first pulse and a fourth pulse, said fifth pulses respectively having amplitudes proportional to the amplitudes of said first pulses at the points of coincidence with said fourth pulses; and a pulse amplitude detector coupled to said coincidence tube and including means for detecting the peak amplitude of each said fifth pulse to provide a direct current signal having a level responsive to said peak amplitude, and integrating means for maintaining the level of said signal between said fifth pulses thereby providing a direct current output signal having a level during said predetermined period which follows the amplitude of said first pulse along their waveform.

11. The combination of claim 10 further comprising: means providing first timing pulses respectively at first predetermined intervals following initiation of said second pulses; means providing second timing pulses respectively at second predetermined intervals following initiation of said second pulses, a first and second timing pulse being provided during each said first pulse; a bistable multivibrator; an adding circuit coupling said first timing pulses providing means and said blocking oscillator to said bistable multivibrator for turning on said bistable multivibrator responsive to coincidence of a fourth pulse and a first timing pulse and for turning off the same responsive to coincidence of a fourth pulse and a second timing pulse thereby to provide a gating pulse having a duration shorter than said predetermined period; and gating means coupled to said pulse amplitude detector and to said bistable multivibrator for passing said output signal during said gating pulse.

12. The combination of claim 11 wherein the output of said bistable multivibrator is a signal having a predetermined constant level of a given polarity between gating pulses which is reduced to zero during a gating pulse, wherein the output of said pulse amplitude detector has the same polarity, and further comprising evaluator means coupled to said gating means and to said bistable multivibrator means for providing an indication when said output signal deviates from said predetermined level by a predetermined amount during said gating pulse.

13. The combination of claim 10 further comprising means coupled to said pulse amplitude detector for rapidly bringing said output signal level to zero at the end of said predetermined period.

References Cited in the file of this patent
UNITED STATES PATENTS

| | | |
|---|---|---|
| 2,490,530 | Laughlin | Dec. 6, 1949 |
| 2,624,770 | Yetter | Jan. 6, 1953 |
| 2,783,436 | Gray | Feb. 26, 1957 |
| 3,011,129 | Magleby et al. | Nov. 28, 1961 |